Patented Feb. 21, 1950

2,498,387

UNITED STATES PATENT OFFICE 2,498,387

BLUE GLASS AND METHOD OF MAKING

William H. Armistead, Corning, N. Y., assignor to Corning Glass Works, Corning, N. Y., a corporation of New York No Drawing. Application September 29, 1947, Serial No. 776,861

3 Claims. (Cl. 106—53)

1

This invention relates to improvements in borosilicate glasses which are colored only with cobalt and in which the color due to cobalt is modified by the presence of chlorine in the glass, as is described in the Taylor Patent 1,572,625. Such patent discloses compositions ranging from 15% to 76% $SiO_2$, 12% to 80% $B_2O_3$, 2% to 18% alkali metal oxide, 0% to 5% $Al_2O_3$ and 0.1% to 0.3% $Co_2O_3$, to 97 parts by weight of which are added 3 parts by weight of alkali metal chloride. The patent shows that in such glasses containing considerable boric oxide the normal color due to cobalt is purple to red, and that the introduction of chlorine into the glass changes the color to blue, and in some instances to green, without the use of any other coloring agent.

It is known that chlorine is effective as a fining agent for the removal of bubbles from borosilicate glasses during melting. Hence glasses made according to the above-mentioned patent should fine readily. I have found on the contrary that these prior glasses do not fine satisfactorily when a blue color is desired, as for example in glasses for the production of daylight effects from artificial light sources, but that the introduction into the glass of chlorine sufficient to cause proper fining results in a color which is too green. In other words, in order to produce a proper blue color in the prior glasses, it is necessary to use an amount of chlorine which is insufficient to cause fining and in order to obtain proper fining it is necessary to add such an excess of chlorine that the green transmission of the glass is objectionably high.

The primary object of this invention is to produce borosilicate glasses which are colored blue by cobalt and chlorine, and which are free from bubbles.

Another object is to fine with chlorine a borosilicate glass containing cobalt without making the color of the glass green.

Another object is to control the effect of chlorine on the color due to cobalt in a borosilicate glass.

Another object is to provide a new combination of ingredients for fining a borosilicate glass and producing a blue color therein.

I have now discovered that a proper blue color can be produced in such prior borosilicate glasses and at the same time the glasses can be properly fined if a small amount, say not over 3%, of one or more of the divalent metal oxides BeO, CaO, ZnO, SrO, CdO, BaO and PbO is added to the glass and the analytical chlorine content is more than the stoichiometric equivalent of the cobalt

2 content as $CoCl_2$. In brief, the glasses of this invention, in order to accomplish the above and other objects, must be composed of silica, boric oxide, alumina, alkali metal oxide, and not over 3% of a divalent oxide, are colored only by cobalt, and contain by analysis at least the stoichiometric amount of chlorine equivalent to all of the cobalt as $CoCl_2$.

In carrying out the invention, the chlorine is introduced into the glass preferably as an alkali metal chloride such as KCl. Since a substantial proportion of the amount which is added to the batch will be volatilized and lost during melting, and since the amount which is thus lost will vary with the time and temperature of melting, the type of melting container, etc., it is impossible to state definitely the minimum amount which should be added to any batch. In any case, however, it is necessary to add to the batch an excess of the chlorine-containing material sufficient to leave in the glass a chlorine content which is at least the stoichiometric equivalent of the cobalt content. The proper amount to be added to a batch may easily be determined by trial.

The optimum content of divalent oxide likewise is dependent upon various factors including the chlorine content and hence cannot be stated with exactness for any and all compositions. For a given composition it may be determined by trial. In any case, the total amount of divalent oxide should not at the most exceed 3% of the finished glass and preferably should not exceed 1%. The divalent oxides BeO, CaO, ZnO, SrO, CdO, BaO, and PbO are all commonly employed as glass-making oxides. For the present purpose any one or all of them are effective, but the use of CaO is preferred because it is cheap and readily available.

The above-mentioned Taylor patent states that such oxides should be omitted from the glass as tending to nullify the effect of chlorine. I have found, however, that in the small amounts mentioned above, they are beneficial with cobalt in producing a proper blue color which is suitable for obtaining daylight effects with artificial light sources.

The amount of cobalt which is necessary to produce a proper blue color in the present glasses will vary, depending upon the desired density of the color or its saturation. It also will vary with the thickness of the glass article, and amounts which suffice to color a thin article blue by transmitted light may appear black in a thickness ten times as great. Therefore, the thicker the article, the less the amount of cobalt which is necessary to produce a given color saturation. The maximum amount of cobalt in the present glasses should not exceed that which is necessary to color them blue by transmitted light, depending upon the thickness in which they are to be employed.

Practically any relatively stable and easily meltable combination of silica, boric oxide, alumina, and alkali metal oxide is suitable as the base glass of this invention. A batch which I have found particularly suitable is composed approximately of 100 parts by weight of sand, 49 parts of boric acid, 19 parts of potassium nitrate, 14.5 parts of potassium chloride, 8.5 parts of hydrated alumina, $Al(OH)_3$, 1.65 parts of calcium carbonate, and .06 part of cobalt oxide. The oxide composition of this batch, calculated to the same basis as the compositions of the prior patent referred to above, is 69.9% $SiO_2$, 19.3% $B_2O_3$, 6.2% $K_2O$, 4.0% $Al_2O_3$, 0.6% CaO and 0.04% cobalt oxide to 100 parts by weight of which are added approximately 10 parts by weight of KCl. Stoichiometrically 0.04 part by weight of cobalt oxide requires 0.034 part by weight of chlorine to form $CoCl_2$, the excess KCl serving to fine the glass by volatilization.

The above batch, when melted in a closed pot, produces a blue glass which is free from bubbles and which by analysis contains .22% Cl. It will be noted that the analytical chlorine content of the final glass exceeds the stoichiometric amount of chlorine which is equivalent to the cobalt content estimated as $CoCl_2$. When employed in a thickness of about 6 mm., this glass is particularly suitable for producing daylight effects with artificial light sources. In lieu of potash, soda may be substituted wholly or in part, but potash is preferable because it produces a purer color.

I claim:

1. A blue glass which consists of approximately 69.9% $SiO_2$, 19.3% $B_2O_3$, 4% $Al_2O_3$, 6.2% $K_2O$, .6% CaO, and .04% cobalt oxide, and also contains by analysis about .22% chlorine.

2. A blue glass composed of 15% to 76% $SiO_2$, 12% to 80% $B_2O_3$, 2% to 18% alkali metal oxide selected from the group consisting of $K_2O$, $Na_2O$, $Li_2O$ and mixtures of a plurality thereof, $Al_2O_3$ in an amount up to 5%, cobalt oxide in an amount less than 0.3%, and chlorine, the amount of chlorine, analytically determined and computed as Cl, being slightly in excess of the stoichiometric amount required to form $CoCl_2$ with the cobalt in the glass, said glass also containing a divalent metal oxide selected from the group consisting of BeO, CaO, ZnO, SrO, CdO, BaO, and PbO in an amount less than 1%.

3. In the method of fining and modifying the color of a blue glass composed of 15% to 76% $SiO_2$, 12% to 80% $B_2O_3$, 2% to 18% alkali metal oxide selected from the group consisting of $K_2O$, $Na_2O$, $Li_2O$ and mixtures of a plurality thereof, $Al_2O_3$ in an amount up to 5%, and cobalt oxide in an amount less than 0.3%, by adding a chloride to the batch, the step which consists in introducing into the glass a total amount of chlorine which, when analytically determined and computed as Cl, slightly exceeds the stoichiometric amount required to form $CoCl_2$ with the cobalt in the glass and a divalent metal oxide selected from the group consisting of BeO, CaO, ZnO, SrO, CdO, BaO and PbO in an amount less than 1%.

WILLIAM H. ARMISTEAD.

REFERENCES CITED

The following references are of record in the file of this patent:

UNITED STATES PATENTS

| Number | Name | Date |
|---|---|---|
| 1,572,625 | Taylor | Feb. 9, 1926 |